United States Patent
Connor

(10) Patent No.: US 8,745,713 B1
(45) Date of Patent: *Jun. 3, 2014

(54) METHOD AND SERVICE FOR SECURING A SYSTEM NETWORKED TO A CLOUD COMPUTING ENVIRONMENT FROM MALICIOUS CODE ATTACKS

(75) Inventor: Michael James Connor, Laguna Woods, CA (US)

(73) Assignee: Cloud Cover Safety, Inc., Laguna Woods, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/606,410

(22) Filed: Sep. 7, 2012

Related U.S. Application Data

(60) Provisional application No. 61/696,080, filed on Aug. 31, 2012.

(51) Int. Cl.
*H04L 29/06* (2006.01)
*H04L 9/32* (2006.01)

(52) U.S. Cl.
CPC .............. *H04L 63/0414* (2013.01); *H04L 9/32* (2013.01)
USPC ................ 726/6; 726/2; 726/3; 726/4; 726/5; 713/187; 713/188

(58) Field of Classification Search
CPC ........................................................ H04L 9/32
USPC ............................................................ 726/26
See application file for complete search history.

(56) References Cited

U.S. PATENT DOCUMENTS

| | | | | |
|---|---|---|---|---|
| 6,016,402 | A * | 1/2000 | Thomas et al. | 710/8 |
| 7,017,039 | B2 * | 3/2006 | Hensley | 713/2 |
| 8,528,062 | B1 * | 9/2013 | Connor | 726/6 |
| 2006/0080518 | A1 * | 4/2006 | Dellacona et al. | 711/163 |

* cited by examiner

*Primary Examiner* — Longbit Chai
(74) *Attorney, Agent, or Firm* — Daniel R. Kimbell; Karish & Bjorgum PC

(57) ABSTRACT

A system and method to prevent the installation by a hacker of malicious software onto networked electronic systems, computers, and the like, by removing the read, write and execute administrator permission files of a system's OS, and placing them in a in a separate, protected server in the cloud. The secure cloud server records the system's unique ID(s). After relocation of the authorized administrator's permissions files, a strong password is requested from the authorized administrator. Thereafter, the network path to the secure cloud server files is encrypted and recorded on the protected system. This path change replaces the former local path in the computer system to those files. The result of these changes to the OS on a protected system eliminates the hacker's access to the system from a network to illicitly become an administrator of the hacked system.

30 Claims, 6 Drawing Sheets

METHOD AND SERVICE FOR SECURING A SYSTEM NETWORKED TO A CLOUD COMPUTING ENVIRONMENT FROM MALICIOUS CODE ATTACKS

CROSS-REFERENCE TO RELATED APPLICATIONS

This application claims benefit of U.S. Provisional Patent Application No. 61/696,080, entitled "A METHOD AND SERVICE FOR SECURING A SYSTEM NETWORKED TO A CLOUD COMPUTING ENVIRONMENT FROM MALICIOUS CODE ATTACKS" filed on Aug. 31, 2012.

BACKGROUND OF THE INVENTION

The invention relates generally to securing networked electronic systems including computers (servers, desktops, laptops, tablet computers, e-readers, or other computer embodiments), mainframe computers, network storage devices, routers, smart phones, cellular phones, phone systems with IP addresses, game devices, servers, telecommunications hubs/devices, Bluetooth devices and other electronic devices that use an operating system that are networked, frequently or infrequently and may be subject to software updates and upgrades. The system to be protected is one that is connected, frequently or infrequently, to a network during its operation. The protection is designed to prevent the installation of malicious software (e.g., viruses, worms, and Trojans) onto the system while it is connected to one or more cloud networks including an intranet, the Internet, a broadband wireless network, a secure network, a VOIP network, a local network, a Bluetooth or other network connection. The term "system", as used in this disclosure, refers to either a computer (servers, desktop, laptop, tablet computers, e-readers, or other computer embodiments), a mainframe computer, a router, a telecommunications hub/device, a server, a network storage device, a smart phone, a cellular phone, a game device, a Bluetooth device, or any other electronic device that uses an operating system that connects to a network including an intranet, the Internet, a broadband wireless network, a secure network, a VOIP network, a local network, a Bluetooth or any other network embodiment.

Hackers must gain access to the administrator permissions files of a computerized device in order to install viruses, Trojans, worms or other malicious software. They do this using a huge number of means to gain access. Closing the many access vulnerabilities to a system from remote hackers is the basis of the many Internet security services that install and frequently update antivirus software on systems. Unfortunately, no antivirus software to date has been one hundred percent successful at preventing systems from being hacked. Hackers are constantly finding new ways to hack a system. In each case they eventually gain control of the administrator permissions files of a system and successfully install their malicious software.

The invention provides enhanced security by removing the read, write and execute administrator permission files of a system's operating system (OS) and placing them in a separate, protected server in the cloud (intranet, internet or secured private network). When this is done the secure cloud server must record the system's unique ID(s). These ID(s) can be the system's IP address, MAC number, or any other unique hardware ID and a combination of one or more software ID(s) like the unique license of the system's operating system (OS). It can include one or more application licenses of previously installed software. It is important that one of the system's IDs be a unique hardware ID and any other ID(s) that may be additionally used be legal licensed software (i.e., software licensed specifically for the system to be protected) that has been previously installed. Optionally, these files can also be encrypted and stored on a server whose encryption keys are known only to the organization responsible for storing the files on a secure cloud server. After relocation of the authorized administrator's permissions files has been completed, a strong password is requested from the authorized administrator. Additional information including information designed to recover lost or forgotten passwords may also be collected depending on the type of system being secured. This information is retained in the cloud server and should be backed up on one or more off site secure servers to meet disaster recovery requirements. Once the removal process has been completed the network path to the secure cloud server storing the protected system's data is encrypted and recorded on the protected system. This path change replaces the former local path in the individual computer or system to those administrator permissions files. The result of these changes to the OS on a protected system makes hacking that system from a network virtually impossible. This means it is now impossible to install viruses, Trojans, worms or other malicious software on a protected system. It also means that antivirus software is no longer required.

Computers, servers, tablet computers, e-readers, cellular telephones, smart phones, phone systems with an IP address, telecommunications hubs/devices, network storage devices, mainframe computers, networked game devices and other electronic devices that are networked, even for brief periods of time, are currently subject to be hacked while connected to a Cloud network environment (e.g., to enable software updates and upgrades). A hacker can gain access to the read, write and execute administrator permissions files and becomes the new administrator of the hacked system by employing a variety of methods. Once control of the system's OS has been accomplished, the hacker can install a virus, Trojan (malware that masquerades as a legitimate file or helpful program with the purpose of granting a hacker unauthorized access to a computer), worm (a standalone malware computer program that replicates itself in order to spread to other computers) or other malicious software that can perform unauthorized activities including copying, changing and/or transmitting data files, installing key logging/monitoring software, deleting files and launching denial of service (DOS) attacks on other systems.

When new software, software updates, or changes to critical protected files is required, the authorized administrator must first gain access to the system to be updated. The authorized administrator enters the correct password to establish the network connection from the system to be updated to the secure server in the cloud that contains that system's critical administrator permissions files and systems ID(s). After the correct password has been entered and system ID(s) have been determined from the system connected to the server, the cloud server examines the system to be updated and compares the system's ID and/or other unique system identifiers with the data previously stored in the server. If there is an incorrect match, no software installs or updates can take place. When the password and system ID(s) match, normal installation of software can proceed. The new software to be installed can now be downloaded from a known, trusted and authenticated source or it can be installed from a local source like a USB drive or other data storage media. To further enhance security it is recommended that all network traffic between remote servers used to store administrator permissions files and the system to be protected be encrypted. Keys to encrypt decrypt and transmit critical system and administrator data stored on the secure cloud servers should be changed frequently by the cloud secure server administrator to provide additional protection.

DESCRIPTION OF THE RELATED ART

The following art defines the present state of this field and each disclosure is hereby incorporated herein by reference as may be necessary to provide essential material to this current patent application and patent(s) that issue therefrom.

Dellacona et al., U.S. Pat. Application Pub No 2006/0080518 A1. This is a Continuation-in-Part application of prior filed U.S. application Ser. No. 10/962,026, filed on Oct. 8, 2004, and entitled, "Removable/Detachable Operating System." An external drive is engaged with a selected computer, as for instance, through a USB port, a SD card slot or other separate storage device that can be removed from the computer or separated from the computers access via a physical on/off switch. The external drive provides memory space and an executable program with auto-launch capability so that when the external drive is engaged the executable program is launched. The program requests "read", "write" or "execute" functions on a test file in the executable program, and flags the DLL program segments, or other files, that carry out these functions in the selected computer's operating system. It then copies the flagged DLL control segments; or other files, to the external drive memory space, and changes the operating path for these functions to the external drive. In a second embodiment, when the user or owner of the selected computer is not using the computer, the external drive may be removed leaving the selected computer without the ability to execute "read", "write" or "execute" commands since the new path is now invalid without the external drive in place.

Thomas et al., U.S. Pat. No. 6,016,402 describes a large capacity removable media drive that is integrated into a computer as a floppy disk drive. The method and apparatus are suited to an environment in which the removable media disk drive is configured as the first fixed disk drive in the computer. Thus, the removable media drive is recognized by the BIOS as a fixed disk drive. A substitute master boot record is provided to the computer from the removable media drive in response to a request for the master boot record of the media. Control of the boot sequence is thereby gained. The substitute master boot record loads a boot program that alters the operating system to recognize the removable media drive as a floppy disk drive.

Hensley, U.S. Pat. No. 7,017,039 describes a modern computer operating system that is altered to boot and run from a protected medium such as a CD-ROM. Files and configuration information are copied from a fully configured and operational OS to a hard drive image file. File system filters and device drivers are added that implement an emulated read-write hard disk drive by servicing initial read requests from the image file, and write requests and read requests to previously written data, from a written disk sector data base. The OS is altered to load the filters and drivers during boot, and to subsequently run from the emulated read-write hard disk drive. The hard drive image file is then placed on a bootable protected medium.

BRIEF DESCRIPTION OF THE INVENTION

Hackers gain access to a system by taking control of the OS as the new system administrator. The hacker gains access to the critical administrator files that control permissions of who can read, write and execute files as an administrator. These permissions include the authority to install or update software on the system. Access to a target system is normally done remotely or locally (e.g., at an airport waiting area) using an intranet, the Internet, a wireless broadband network, a secure network, a VOIP network, a local network, a Bluetooth or other network connection to the system being targeted.

Once the hacker tricks the system and becomes the administrator he/she can install Trojans, worms, viruses or other malicious software code to steal data files, key log users, track users, hijack the system to be used for attacks on other systems or other illegal activities. FIG. 1 is a graphic depiction of the hacking process.

The invention prevents hackers from gaining access to the administrator permissions files. These files, once the system is protected, no longer physically reside on the protected system. They are securely stored on a cloud server together with a record of the unique system ID(s) and the correct password of the authorized administrator of the protected system. Without the administrator permissions files, unique system ID(s) and actual network access from the protected system to the secure cloud server containing the administrator permissions files, no hacker can remotely gain access and install malicious software on a system. This makes a system protected with this invention invulnerable to any network hacker attack.

To thwart this type of attack and secure a system, the invention secures the read, write and execute administrator permissions files in a secure server in the cloud (Internet or intranet). This results in the administrator files no longer residing on the protected system but instead residing on a protected server in the cloud. Access to the protected server can only be made after the authorized administrator (not a hacker) enters the required password. If the password and the unique system ID(s) of the protected system are correct, software changes can be made. This feature insures that a stolen password sent from the wrong system will not work. The actual system to be updated must be the system making the update request. Thus, the invention makes it impossible for the hacker to become the OS administrator by attacking a system via a network.

The system to be protected can operate using any modern OS including but not limited to Windows, Mac, Unix, Linux, IOS, Android, other cell phone operating systems, DOS, or any of a variety of OSs that support electronic devices that require a network connection.

A novel feature of this invention employs cross-platform code (e.g., XML, HTML, or other cross platform development tools like Webkit2) that support a variety of systems running different operating systems and installation scripts that recognize the system's OS and its version. In that manner the correct installation script is executed to perform required software changes to the OS eliminating the need for multiple platform infrastructures.

After the administrator files have been identified and copied they are encrypted and transferred over the Internet to a networked secure cloud server where they are encrypted stored and password protected. In addition, the system's unique system ID(s) is determined, copied, encrypted, transmitted and stored with the administrator's permissions files on the secure cloud server. The network path to the read, write and execute permissions files is changed from the system to be protected to the remote secure cloud server and encrypted and recorded on the protected system.

Prior art makes use of additional hardware directly connected to a system to implement their inventions. With this invention, no special hardware such as a separate storage device (e.g., USB drive with a mechanical on and off switch or a separate bootable hard drive or CD ROM) is required to be connected to the system to be protected. For example, prior art requires the use of special hardware that is connected to a system when the administrator permissions files are changed or even when a system is in use. The invention does not require the procurement and direct connection of any new hardware of any kind. With the advent of cloud computing the invention can be implemented using existing cloud infrastructure connected to any networked system with an operating system (OS) in order to create a protected system. Once the security install is completed the system cannot be hacked remotely from a network.

Moreover, an important differentiating feature of the invention makes use of the unique system ID(s) of the system to be protected. The ID(s) are used to identify the specific system to be protected and to subsequently connect to the secure cloud server in order for the authorized administrator to make any subsequent changes to the administrator permissions files.

One objective of the present invention is to provide a method to identify a system's correct OS and version number, separate the administrator permissions files from a system, and to relocate them to a secure cloud server making it for all intents and purposes impossible for a hacker to gain control of a system and install malicious software.

Another objective of the invention is to determine a system's unique system ID(s) and to store the ID(s) on a secure remote cloud server to authenticate the correct system for authorized administrator changes, software installs, updates, critical protected files changes and other functions reserved to the authorized system administrator.

Yet another objective of the invention is to provide a means to verify the authenticity of software installs by first logging onto a secure cloud service that stores the administrator permissions files of a system and then requesting a software download or update only from known, trusted and authenticated sources.

A further objective of the invention is to prevent unauthorized access to the administrator files of an operating system from an intranet, the Internet, broadband network, secure network, wireless network, VOIP network, Bluetooth or other network connection.

A further objective of the invention is to change the path for the administrator permissions files from the system to be protected to a networked secure cloud server so that the system cannot make unauthorized changes to a system including software installs without a connection being made to the correct secure cloud server.

A further objective of the invention is to provide, if the authorized administrator so chooses, a trusted backup copy of the original OS, applications and other critical data files on a secure cloud server in case the original files should become corrupted or lost.

A further objective of the invention is to provide a method to secure trusted information about an authorized administrator like his/her fingerprint(s), hand print, eye/facial recognition or other biometric data and/or personal information about the authorized administrator that would be generally unknown to a hacker.

A further objective of the invention is to provide a method to sell a security service comprising this invention over the Internet or at an authorized point of sale/authorization like a licensed retailer. This process uses an initial temporary password and identification of the system's unique system ID (s) for later use by the authorized system administrator to secure a system. This process requires the buyer/user to access a trusted, known site, make a purchase or receive an authorization, receive a temporary password and reboot the system after which the authorized system administrator would log onto the system and connect to a secure server in the cloud to complete the system security process previously described in this patent. The buyer/user can also go to an authorized location like a retailer or organization IT department where a store/organization employee can sell/authorize the service, record the unique system ID(s), transmit that information to a secure cloud server and provide a temporary password to the buyer/user. Once done, the buyer/user provides the temporary password to the authorized system administrator. Only the authorized administrator can proceed with the next steps. The authorized administrator logs on as the administrator and proceeds to a second site that has been download to the system or provided at the point of sale or organization support. Once connected to the site he/she is prompted to enter the temporary password. The secure cloud server compares the unique system ID(s) recorded at time of purchase/authorization and sent separately to the cloud server from the initial Internet site or the store/organization and determines if there is a match. If so, the remainder of the process described in this patent is initiated. If not, no further changes can be made to the system being protected by the secure cloud server. This process prevents spoofing of a secure cloud server by a hacker.

Other features and advantages of the embodiments of the present invention will become apparent from the following more detailed description, taken in conjunction with the accompanying drawings, which illustrate, by way of example, the principles of at least one of the possible embodiments of the invention.

DETAILED DESCRIPTION OF THE INVENTION

The FIGS. 1-5 illustrate the present disclosure in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and they should not be taken as limiting the invention as defined in the following. Again, the terms "system" and sometimes "computer network connectable device or system" as used herein refers to either a computer (servers, desktop, laptop, tablet computers, e-readers, or other computer embodiments), a mainframe computer, a router, a telecommunications hub/device, a server, a network storage device, a smart phone, a cellular phone, a game device, a Bluetooth device, or any other electronic device that uses an operating system that connects to a network including an intranet, the Internet, a broadband wireless network, a secure network, a VOIP network, a local network, a Bluetooth or any other network embodiment. The terms "system" "computer network connectable device or system" are intended to encompass any device or collection of devices, hardware, firmware, and/or software that can be hacked.

Preferred Methods of How to Create a Protected System from Malicious Hacker Attacks by using a networked protected server in the cloud to store the read write and execute administrator permissions files of the system's OS will now be described.

Figure 1:
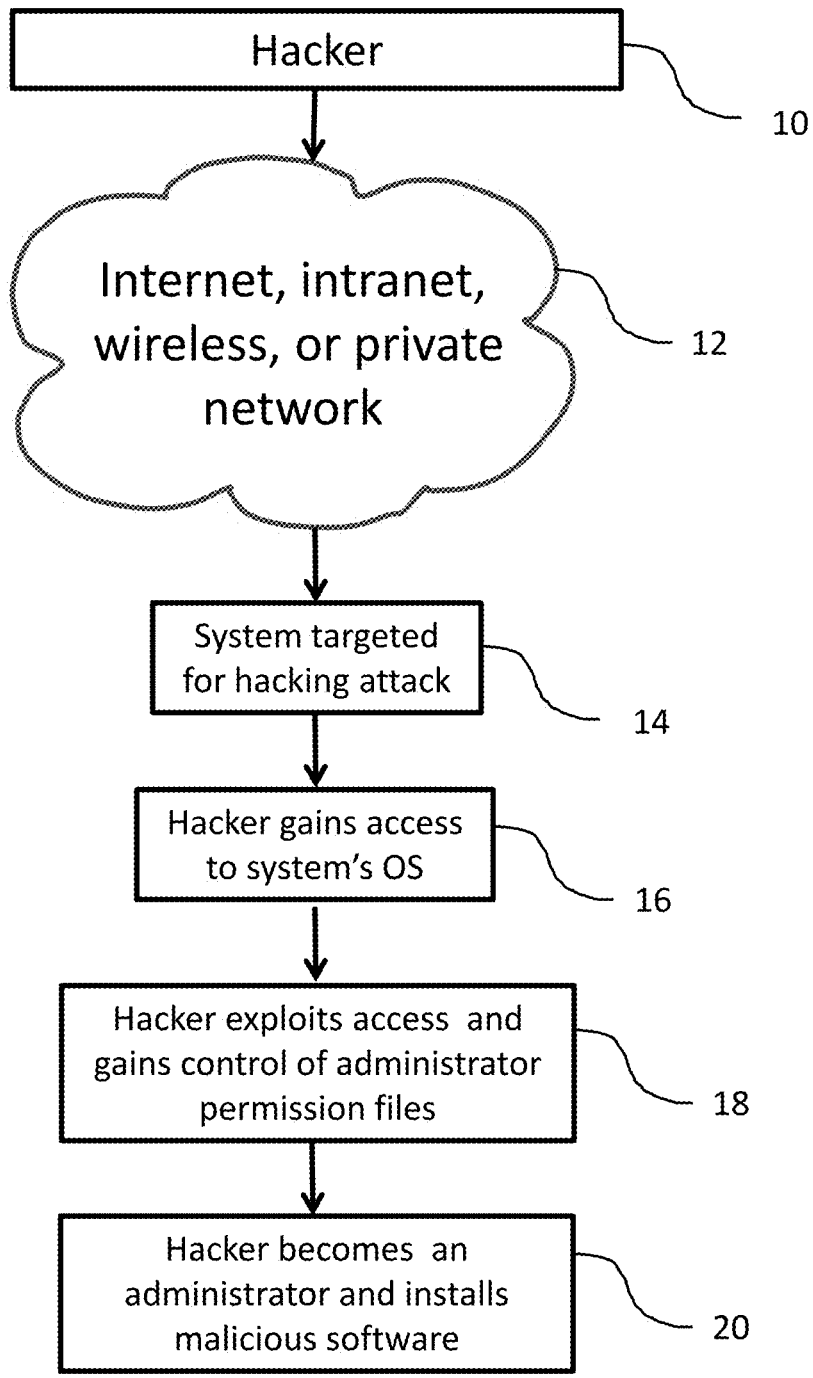
FIG. 1 is a diagram showing how a hacker can gain control of a system and install viruses, Trojans, worms, and other malicious software.

Referring first to FIG. 1, this diagram shows how a hacker 10 can gain control of a system and install viruses, Trojans, worms, and other malicious software. First, the hacker attempts to connect to a target system 14 (e.g., a computer, a computer network, or some other electronic device) via an Internet, intranet, wireless or private network connection 12. Next, the hacker gains access to the system's Operating System (OS) using one or more techniques designed to exploit a system's vulnerabilities 16. These techniques are wide, varied, and generally well-known, and will therefore not be discussed further herein, other than to repeat that in order to install Trojan horses, viruses, worms, key loggers, and/or other malicious software, the hacker must gain control of the system as the administrator. Then, the hacker exploits access and gains control of the administrator permissions files to become recognized by the system as the administrator 18. Finally, the hacker installs the Trojan horses, viruses, worms, key loggers, and/or other malicious software 20. Many times, the user of the computer system does not even know this has taken place.

Figure 2:
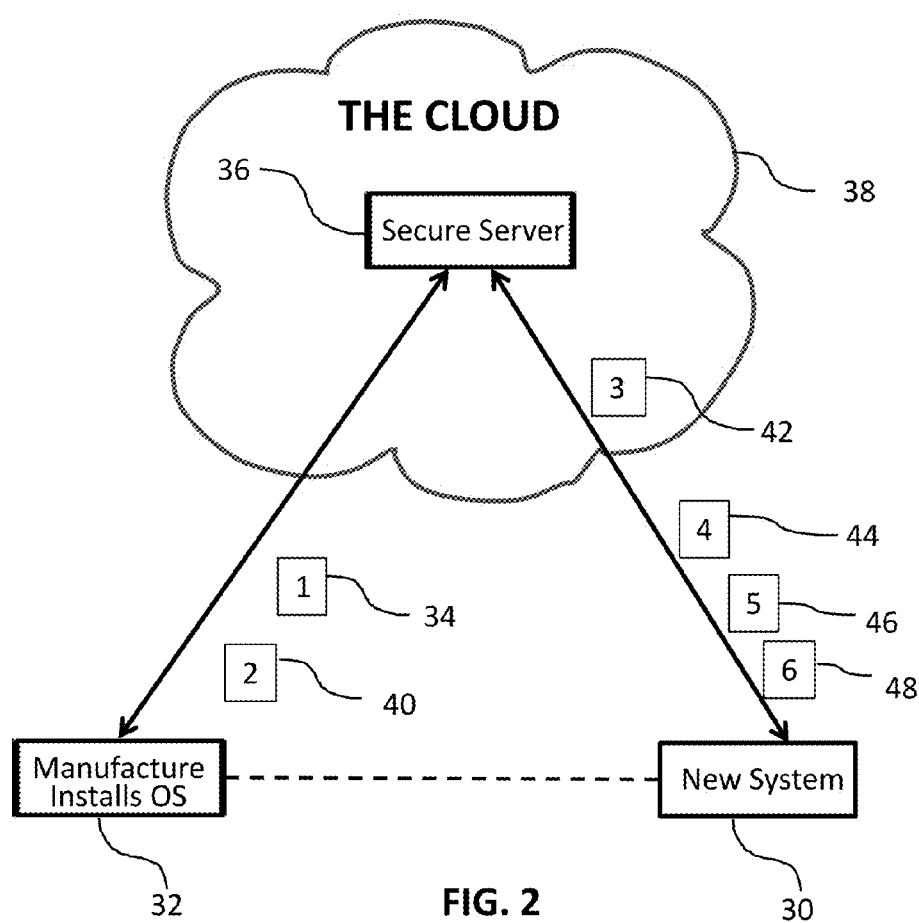
FIG. 2 is a diagram showing how a system protected by a manufacturer prevents hacking of that system.

Turning now to FIG. 2, it is a diagram showing how a new system 30 protected by a manufacturer is set up to prevent hacking of that system. Namely, this is an exemplary embodiment of the invention wherein a new system 30 comes with pre-install of the protection of the invention by a manufacturer 32 (or some other vendor) of an electronic system with an OS that performs a network connection.

In a first step 1, 34, the manufacturer or some third party 32 installs the system's OS on the system 30 along with all other required software and data files. The exception to normal installation is that the installation is made without installing the administrator permissions files. Instead, those administrator permissions files, the unique hardware ID(s) of the system, and a temporary password, are stored on a secure server 36 in "the cloud" 38 along with, and any other applications programs, data files and software deemed necessary. In the second step 2, 40 the manufacturer 32 or some third party installs the encrypted network path to those administrator files and system ID on a secure server in the cloud 38. In the third step 3, 42 a buyer/administrator receives the system 30, and is provided with the same temporary password that was stored on the secure cloud server and the URL web address. In the next step 4, 44 at first boot up and when a proper network connection is made to the secure server 36, the authorized administrator (e.g., the buyer or someone else designated by an organization or household to be the authorized administrator) is prompted to enter the temporary password. Next 5, 46 the secure cloud server 36 compares the temporary password and unique hardware ID(s) with those stored on the secure server. If both match the data previously stored on the secure cloud server 36, the administrator is prompted to replace the temporary password with a new strong password that he/she is prompted to record somewhere (preferably not on the system) and remember. Next, 6, other registration and permissions information is obtained (e.g., "read only" data for selected users) is entered and stored on the secure cloud server 36 and the system 30 to be protected (e.g., permissions data to read, write and execute as a non-administrator can be stored locally for use when the system is not connected to a network).

Figure 3:
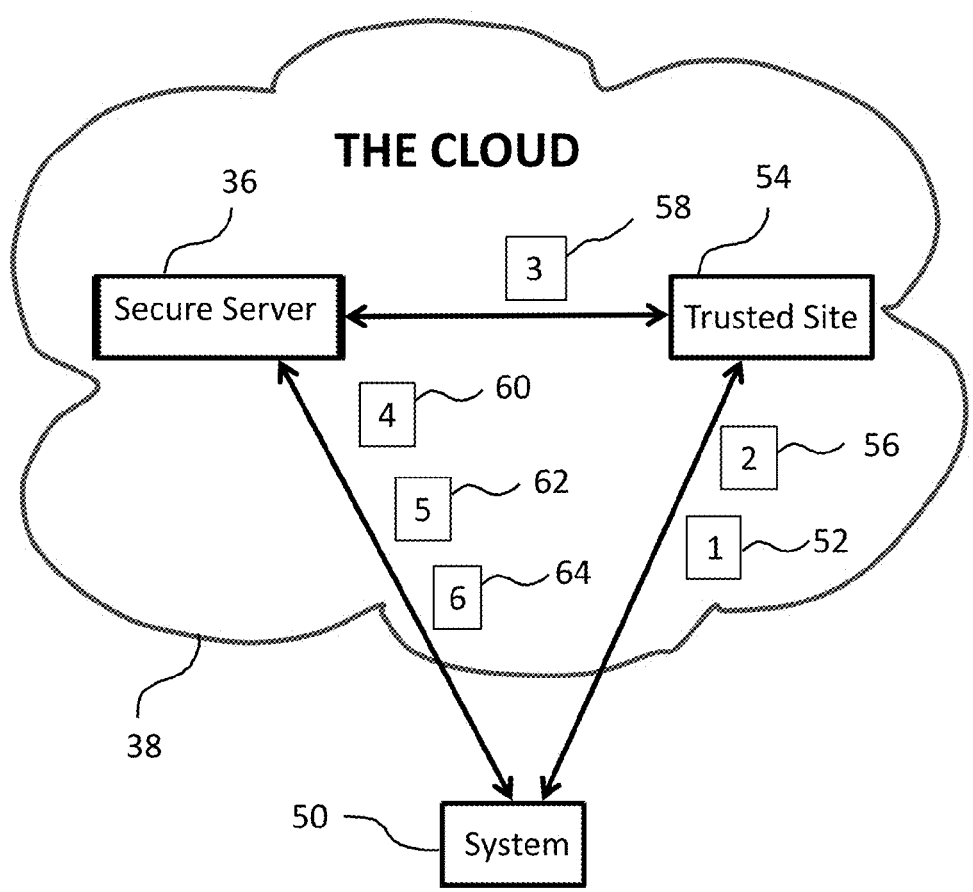
FIG. 3 is a diagram showing how a system is protected from hacking by purchasing protection services from a trusted site on the Internet.

To secure an existing system that is unprotected, either of the following two methodologies and operations can be used. Referring first to FIG. 3, there is shown a method for protecting a system 50 by buying a service from a trusted site on the Internet wherein an install of the service of the invention is made on an existing system by an authorized administrator using a secure remote install process. The same numbering used to describe the exemplary embodiment of the invention of FIG. 2 is used in FIGS. 3-5 where applicable.

In this exemplary embodiment of the invention, in the first step, 1, 52, the administrator (be he/she a buyer or user) goes to a designated, known web site 54 that is trusted and authenticated. In the next step, 2, 56 a purchase transaction is made or an authorized code is entered along with any other required registration information to purchase the protection service of the invention. In a third step 3, 58 when the purchase/authorization process is complete, the point of sale web site records the unique hardware ID(s) and sends that information and a temporary password to a separate protected cloud service 36 having a different authenticated address. This can only occur because the proper certificate has been issued and sent to the system to be protected and an automatic redirect to a secure cloud server initiated. The buyer/user receives a temporary password and the secure server address. Using a separate connection from the point of initial registration/sale the system to be protected the unique system ID(s) is sent to the secure cloud server. In a fourth step 4, 60, the buyer/user connects to the secure cloud server 36 using the provided URL web address and is prompted to enter the temporary password. Following this, in step five, 5, 62 when the authorized system administrator connects to the secure cloud server for the first time, the cloud server 36 compares the ID of the system being registered 50 with the unique hardware ID(s) sent from the point of purchase/initial registration. If there is a match of the stored hardware ID(s) and the password, the secure cloud server 36 determines the system's OS and version, selects the appropriate install script(s) and initiates the install by identifying the administrator permission files, encrypting those files, removing, transmitting, and moving those files to the secure cloud server 36 and enters the network path to those files on the system to be protected 50. The authorized administrator is prompted to enter a strong password and other required registration information including information about authorized user permissions. That information is encrypted and transmitted to the secure server 36 and stored. The path to the administrator permissions files is changed from the system, encrypted and pointed to the secure cloud server 36. Then the protected system is rebooted. Lastly, 6, 64 the user/authorized administrator can safely use the system 50 that is now protected from being hacked.

Figure 4:
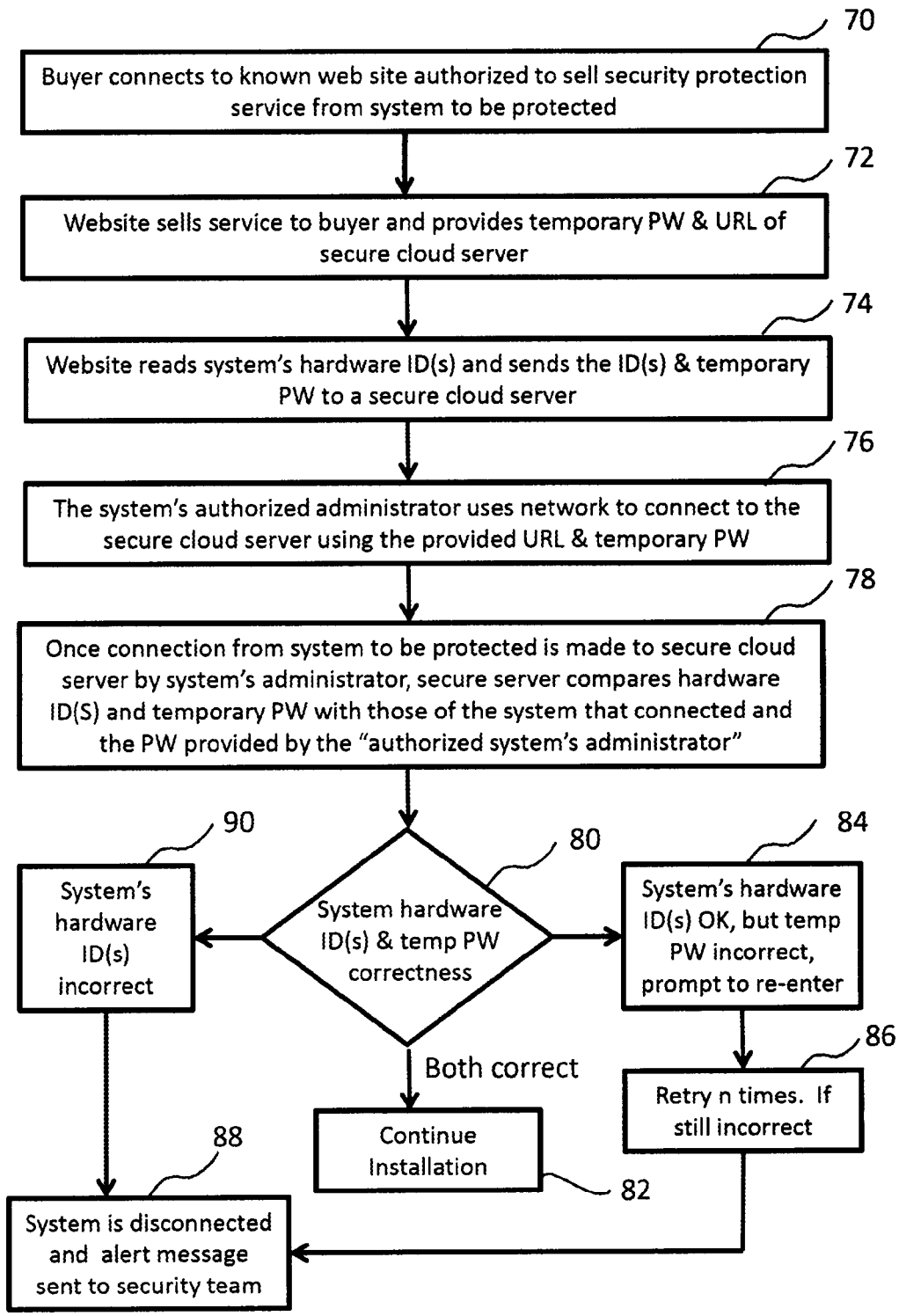
FIG. 4 is the first of two pages with a more detailed diagram showing how a system is protected from hacking by purchasing protection services from a trusted site on the Internet.
Figure 4A:
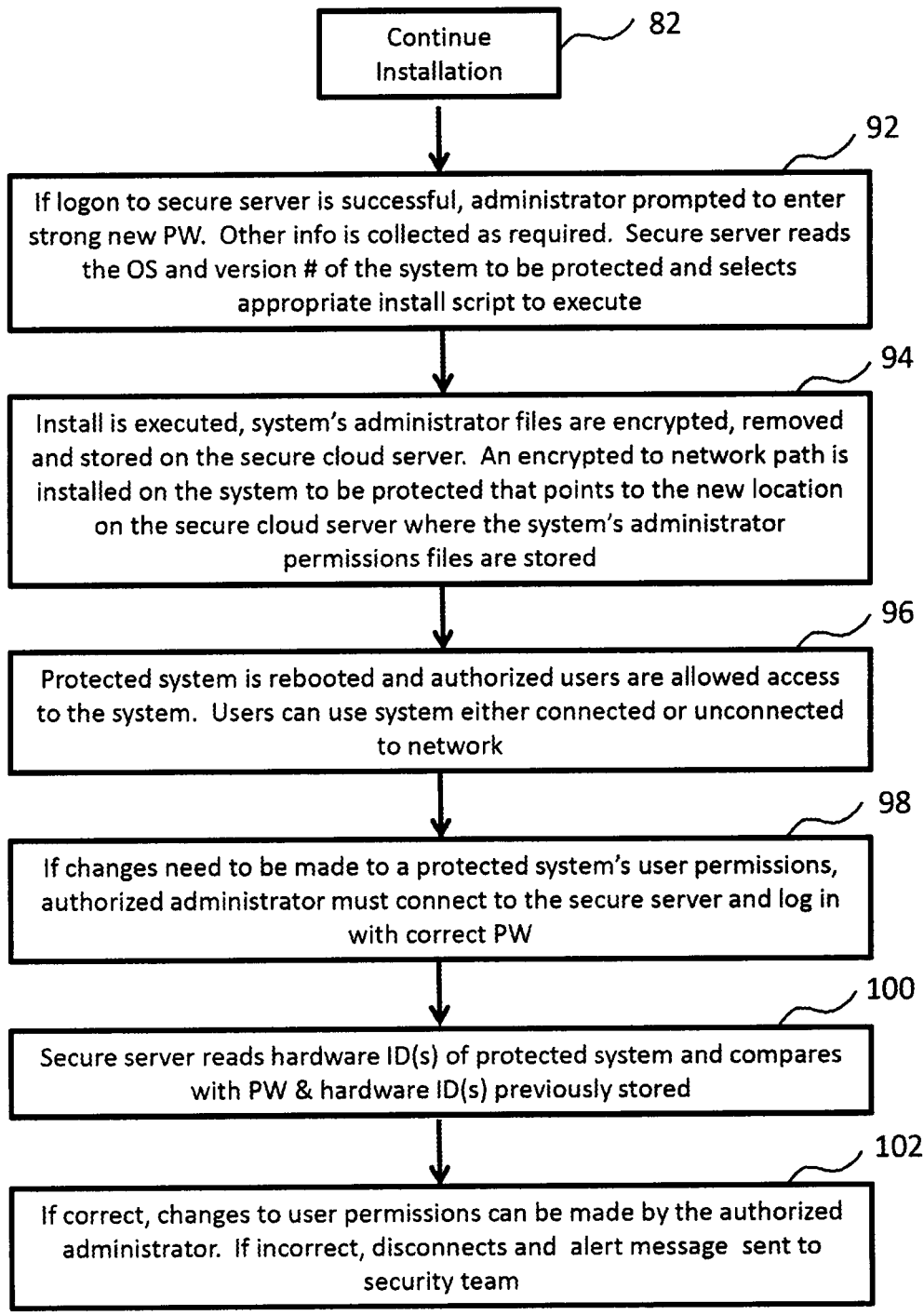
FIG. 4A is the second page of two showing a more detailed diagram showing how a system is protected from hacking by purchasing protection services from a trusted site on the Internet.

FIG. 4 (extending on two pages) is another more detailed diagram showing how a system is protected from hacking by purchasing protection services from a trusted site on the Internet. First, 70 the buyer/users connects to a known web site authorized to sell a security protection service. Next, 72 the buyer/user making the purchase obtains a temporary password and URL web address to a secure cloud server. Then 74, the web site reads the system's hardware ID(s) and sends the ID(s) and temporary password to a secure cloud server. Then 76, the system's authorized administrator connects using a network to the secure cloud server using the provided URL and temporary password. Next, 78, once a connection from the system to be protected is made to the secure cloud server by the system's administrator, the secure server compares the hardware ID(s) and temporary password with those of the system that connected and the password provided by the "authorized system's administrator". The process proceeds through a decision tree 80. If both the hardware ID(s) and temporary password are correct, the install process proceeds 82. However, if the system's system ID(s) is correct but the temporary password is wrong, the administrator is prompted to enter the password again 84. If incorrect a given number of times n, (e.g., 3) 86, the system is disconnected and a message sent to the security team monitoring the security service 88. If the password is correct but the hardware ID(s) is wrong 90, the system is likewise disconnected and a message is sent to the security team monitoring the service 88. At this point, the security team will take appropriate actions, including notifying legal and technical authorities. Continuing 82 (as shown on the second page of FIG. 4), if the logon to the secure server is successful, the administrator is prompted to enter a strong new password 92. The secure server reads the OS and version number of the system to be protected and selects an appropriate install script(s) to execute. Next, the install is executed and the system's administrator files are encrypted, removed and stored on the secure cloud server. An encrypted network path is installed on the system to be protected that points to the new location on the secure cloud server where the system's administrator permissions files, password and other appropriate data are stored 94. Then, the protected system is rebooted and all authorized users are allowed access to the system 96. If changes need to be made to a protected system's user permissions, the authorized administrator must connect to the secure server and log in with correct password 98. The secure server reads the hardware ID(s) of the protected system and provided password compares them with password and hardware ID(s) previously stored 100. If correct, changes to user permissions can be made by the authorized administrator. If not, then the system is disconnected and an alert message is sent to the security team 102.

Figure 5:
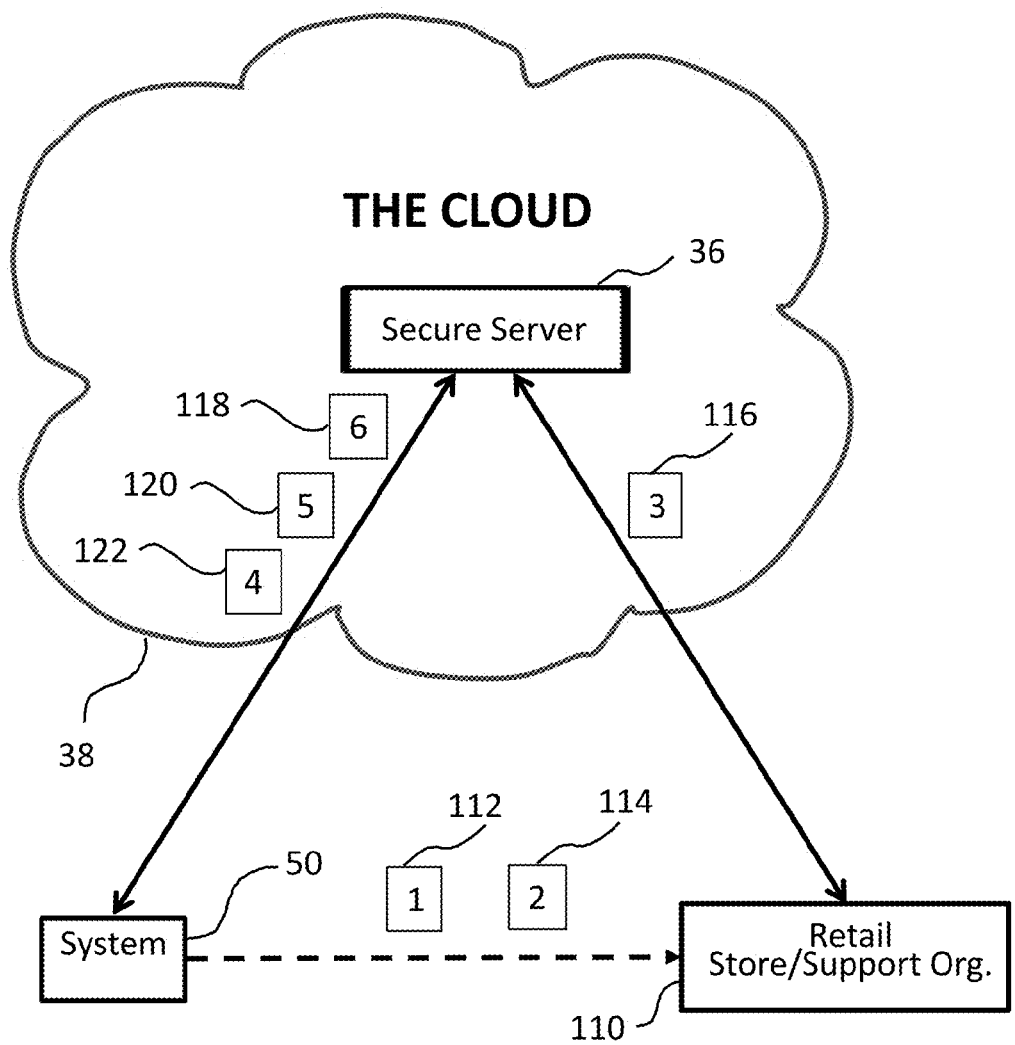
FIG. 5 is a diagram showing how a system is protected from hacking by purchasing protection services from a retail store or receiving an authorization from an organization.

FIG. 5 is a diagram showing another exemplary embodiment of the invention, showing how a system 50 is protected from hacking by purchasing protection services from a retail store or receiving an authorization from an organization 110. In a first step 1, a Buyer/User visits an authorized retail store or his/her organization's IT support facility 112. Next, in a second step 2, 114 the Buyer/User purchases the protection service or obtains an authorization code therefore 114. In a third step, 3, 116 when the purchase/authorization process is complete, the retail store or support organization 110 records the system's unique system ID(s) and sends that information and temporary password to separate protected cloud server 36. The Buyer/User receives a temporary password and a secure server web address (URL). Fourth, 4, 118 the authorized administrator of system connects to the secure cloud server 36 using the URL address and temporary password. In a fifth step, 5, 120 if the password and system ID(s) match, the secure cloud server 36 determines the system's OS and version, selects appropriate install script, and initiates the install by identifying the administrator permissions files, encrypting those files, and removing, transmitting, and storing those files on the secure cloud server. The authorized administrator is then prompted to enter a strong password and other required registration information including information about all authorized user permissions. That information is encrypted and transmitted to the secure server where it is stored. The path to administrator permission's files is encrypted and changed from the protected system and pointed to the secure cloud server. The system is then rebooted. Finally, 6, 122, the authorized administrator and all authorized users can now safely use the protected system without worry that it will be hacked.

The invention in its various embodiments can involve a service provided by various service providers using various methods including the software and hardware infrastructure necessary to support the various embodiments.

What is claimed is:

1. A method for securing a computer network connectable device or system networked to a cloud computing environment from malicious code attacks, comprising:

providing a computer network connectable device or system;

providing to a secured cloud server at least one of the computer network connectable device or system's unique ID and administrator permission files associated with the computer network connectable device or system;

installing an encrypted network pathway from the network connectable device or system to the secured cloud server, wherein said device or system's unique ID is used to connect to the secured cloud server via the network pathway to update the administrator permission files;

providing an administrator of a system with a network connectable device or system with a network address of the secured cloud server and a temporary password for access to the secured cloud server;

having the administrator connect to the network address of the secure cloud server using the temporary password;

having the secured cloud server compare the temporary password provided by the administrator and the device or system's unique ID stored at the server associated with the computer network connectable device or system, and if both match data that the secured cloud server has for the computer network connectable device or system, the administrator is successfully verified as an authorized administrator and for the authorized administrator, prompting the authorized administrator to enter a new password and other required registration information; and allowing the authorized administrator/user to use the computer network connectable device or system upon successful validation of said new password, wherein the method does not require any additional hardware at an authorized administrator/user's end.

2. The method of claim 1, wherein the authorized administrator reboots the computer network connectable device or system after the authorized administrator enters the new password and the protection installation has been completed.

3. The method of claim 1, wherein the computer network connectable device or system comes installed with an OS and wherein at least one hardware ID, the administrator permission files, and a temporary password are sent to the secured cloud server.

4. The method of claim 3, wherein the at least one hardware ID, the administrator permission files, and a temporary password are sent to the secured cloud server in an encrypted form.

5. The method of claim 1, wherein a manufacturer or service provider installs the encrypted network pathway from the computer network connectable device or system to the secured cloud server.

6. The method of claim 1, wherein the network address of the secured cloud server is a URL address.

7. The method of claim 1, wherein the computer network connectable device or system as provided to a user does not have at least one hardware ID and administrator permission files mapped directly to the computer network connectable device or system.

8. The method of claim 1, wherein the authorized administrator reboots the computer network connectable device or system after the authorized administrator enters the new password.

9. The method of claim 1, wherein a stolen password sent from any system other than the protected computer network connectable device or system will not be accepted by the secured cloud server, and thus will not allow a hacker to access the protected computer network connectable device or system and install malicious software thereon.

10. The method of claim 1, wherein software can only be installed on the computer network connectable device or system after getting authorization to do so from the secured cloud server.

11. The method of claim 1, wherein if an incorrect password is entered after a predetermined number of attempts, the computer network connectable device or system will be disconnected from the secured cloud server and an alert will be sent by the secured cloud server to a security team.

12. The method of claim 1, wherein a stolen password sent from any system other than the protected computer network connectable device or system will not be accepted by the secured cloud server, and thus will not allow a hacker to access the protected computer network connectable device or system and install malicious software thereon.

13. A system to provide a service for securing a computer network connectable device or system networked to a cloud computing environment from malicious code attacks, comprising:
   a trusted website, where a purchase takes place, to secure the computer network connectable device or system networked to a cloud computing environment from the malicious code attacks, wherein the trusted website records at least one of the computer network connectable device or system's unique IDs and assigns a temporary password to a purchaser; and
   a secured cloud server that is separate from the trusted website, wherein the trusted website sends the at least one of the computer network connectable device or system's unique IDs and the temporary password to the secured cloud server, and sends the temporary password and a network address of the secured cloud server to the purchaser;
   wherein (a) an administrator connects to the secured cloud server using the temporary password and if the temporary password entered by the administrator matches the temporary password recorded by the secured cloud server, the administrator is successfully verified as an authorized administrator, and the secured cloud server identifies an operating system and a version of the computer network connectable device or system, selects an appropriate installation script, and initiates an installation by identifying administrator permissions flies associated with the computer network connectable device or system, encrypting said permission files, removing, transmitting and storing said permission files on the secured cloud server; (b) the authorized administrator is prompted to enter a new password and other required registration information including information about authorized user permissions, which is transmitted to the secure server and stored; (c) a path to the administrator permissions files is changed from a local path of the computer network connectable device or system, encrypted and pointed to the secured cloud server and stored at the computer network connectable device or system; and (d) the computer network connectable device or system is subsequently rebooted to prevent hackers from gaining control of said administrator permissions files by the malicious code.

14. The system to provide a service of claim 13, wherein the authorized administrator reboots the computer network connectable device or system after the authorized administrator enters the new password.

15. The system to provide a service of claim 13, wherein the computer network connectable device or system comes installed with an OS and wherein at least one hardware ID, the administrator permission files, and a temporary password are sent to the secured cloud server.

16. The system to provide a service of claim 15, wherein the at least one hardware ID, the administrator permission files, and the temporary password are sent to the secured cloud server in an encrypted form.

17. The system to provide a service of claim 13, wherein a manufacturer or service provider installs the encrypted network pathway from the computer network connectable device or system to the secured cloud server.

18. The system to provide a service of claim 13, wherein the network address of the secured cloud server is a URL address.

19. The system to provide a service of claim 13, wherein the computer network connectable device or system as provided to an authorized administrator does not have its least one hardware ID and administrator permission files mapped directly to the computer network connectable device or system.

20. The system to provide a service of claim 13, wherein the computer network connectable device or system's unique ID is selected from at least one of the system's IP address, MAC number, or another unique hardware ID.

21. The system to provide a service of claim 13, wherein software can only be installed on the computer network connectable device or system after getting authorization to do so from the secured cloud server.

22. The system to provide a service of claim 13, wherein if an incorrect password is entered after a predetermined number of attempts, the computer network connectable device or system will be disconnected from the secured cloud server and an alert will be sent by the secured cloud server to a security team.

23. A method for securing a computer network connectable device or system networked to a cloud computing environment from malicious code attacks by hackers by preventing hackers from gaining control of the administrator permissions files of a system and installing malicious software, comprising:
   removing by a separate secured cloud server the read, write and execute administrator permission files of a computer network connectable device or system's operating system and reallocating said permissions files to the secure cloud server on an intranet, the internet, or secured private network;
   storing at the secured cloud server at least one of the computer network connectable device or system's unique ID, which is used to connect to the secured cloud server to update said permission flies;
   requesting a password from an authorized administrator;

changing a path to the administrator permissions files from a local path of the computer network connectable device or system, encrypted and pointed to the secured cloud server and storing said path at the computer network connectable device or system and then reboot said device or system; and allowing the authorized administrator to use the computer network connectable device or system upon successful validation of said requested password, wherein the method does not require any additional hardware at an authorized administrator/user's end.

24. The method of claim 23, wherein in addition to requesting a password from the authorized administrator, additional information including information designed to recover lost or forgotten passwords is collected, which information is retained in the secured cloud server and backed up on one or more off site secured servers.

25. The method of claim 23, wherein the system's ID(s) comprises one or more of the unique hardware ID (e.g., IP address, MAC number, and any other unique hardware ID) and one or more of the system specific unique software licenses.

26. The method of claim 23, wherein the device or system's ID files are encrypted and stored on a separate server whose encryption keys are known only to an organization responsible for storing the files on a secured cloud server.

27. The method of claim 23, wherein additional information including information designed to recover lost or forgotten passwords is collected and is retained in the secured cloud server and is backed up on one or more off site secured servers.

28. A system to provide a service for securing a computer network connectable device or system networked to a cloud computing environment from malicious code attacks by hackers by preventing hackers from gaining control of the administrator permissions files of a system and installing malicious software, comprising:

one of a trusted website, an authorized seller, or predetermined facility, where a purchase takes place, to secure the computer network connectable device or system networked to a cloud computing environment from the malicious code attacks, wherein the trusted website, authorized seller, or predetermined facility records at least one of the computer network connectable device or system's unique IDs and assigns a temporary password to a purchaser; and a secured cloud server that is separate from the trusted website, wherein the trusted website, authorized seller, or predetermined facility sends the at least one of the computer network connectable device or system's unique IDs and the temporary password to the secured cloud server, and sends the temporary password and a network address of the secured cloud server to the purchaser;

wherein an administrator is successfully verified as an authorized administrator using said temporary password;

wherein read, write and execute administrator permission files of the computer network connectable device or system's operating system are secured in the secure cloud server and the recorded unique device or system ID is used to subsequently connect to the secured cloud server with said network address in order to, at least, make subsequent changes to the administrator permission files;

changing a path to the administrator permissions files from a local path of the computer network connectable device or system, encrypted and pointed to the secured cloud server and storing said path at the computer network connectable device or system and then reboot said device or system; and allowing said authorized administrator to use the computer network connectable device or system upon successful validation with a new password, wherein the method does not require any additional hardware at an authorized administrators/user's end.

29. The service of claim 28, wherein the secured cloud server is accessible via the intranet, the Internet, or secured private network, and wherein at least one unique hardware ID of the computer network connectable device or system and optionally one or more of the system's unique software ID(s) is collected by the secure cloud server.

30. The service of claim 28, wherein a stolen password sent from any device or system other than the protected computer network connectable device or system will not be accepted by the secured cloud server, and thus will not allow a hacker to access the protected computer network connectable device or system and install malicious software thereon.

* * * * *